(12) United States Patent
Kim

(10) Patent No.: US 8,918,256 B2
(45) Date of Patent: Dec. 23, 2014

(54) ELECTRIC POWER STEERING APPARATUS AND METHOD CONTROLLING THE SAME

(71) Applicant: Mando Corporation, Pyeongtaek-si, Gyeonggi-do (KR)

(72) Inventor: Seong Joo Kim, Seongnam-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 13/952,191

(22) Filed: Jul. 26, 2013

(65) Prior Publication Data

US 2014/0032050 A1    Jan. 30, 2014

(30) Foreign Application Priority Data

Jul. 26, 2012 (KR) .................. 10-2012-0081713

(51) Int. Cl.
*B62D 6/00* (2006.01)
*B62D 5/04* (2006.01)

(52) U.S. Cl.
CPC .................... *B62D 5/0463* (2013.01)
USPC ................. 701/42; 701/36; 701/41

(58) Field of Classification Search
None
See application file for complete search history.

(56) References Cited

U.S. PATENT DOCUMENTS

| | | | |
|---|---|---|---|
| 6,594,569 B2 * | 7/2003 | Yasuda | 701/41 |
| 6,876,910 B2 * | 4/2005 | Kifuku | 701/41 |
| 2004/0189239 A1 * | 9/2004 | Islam et al. | 318/701 |
| 2007/0144824 A1 * | 6/2007 | Tamaki et al. | 180/446 |
| 2008/0167779 A1 * | 7/2008 | Suzuki | 701/42 |
| 2008/0306655 A1 * | 12/2008 | Ukai et al. | 701/42 |
| 2011/0066330 A1 * | 3/2011 | Kim | 701/42 |
| 2011/0190984 A1 * | 8/2011 | Reeve | 701/41 |

* cited by examiner

*Primary Examiner* — Jonathan M Dager
(74) *Attorney, Agent, or Firm* — McDermott Will & Emery LLP

(57) ABSTRACT

The present invention relates to a technology for controlling an electric power steering apparatus. According to the present invention, a difference in steering feeling according to a change of a mechanical characteristic of an electric power steering apparatus can be corrected so that the sense of difference in steering felt by a driver when using the steering apparatus can be minimized and the reliability in relation to the apparatus can be enhanced.

4 Claims, 4 Drawing Sheets

ELECTRIC POWER STEERING APPARATUS AND METHOD CONTROLLING THE SAME

CROSS-REFERENCE TO RELATED APPLICATION

This application claims priority from and the benefit under 35 U.S.C. §119(a) of Korean Patent Application No. 10-2012-0081713, filed on Jul. 26, 2012, which is hereby incorporated by reference for all purposes as if fully set forth herein.

BACKGROUND OF THE INVENTION

1. Field of the Invention

The present invention relates to an electric power steering apparatus and a method of controlling the same.

2. Description of the Prior Art

A hydraulic steering apparatus is configured such that a hydraulic pump, which is a power source for supplying a steering assist power, is driven by an engine. Thus, the hydraulic steering apparatus always consumes energy regardless whether the steering wheel is rotated or not. Whereas, an electric power steering apparatus is configured such that, when a steering torque is produced by the rotation of the steering wheel, a motor supplies a steering assist power which is proportional to the produced steering torque. Accordingly, when the electric power steering apparatus is used, the energy efficiency may be improved as compared to the case where the hydraulic steering apparatus is used.

The electric power steering apparatus is configured such that the steering torque produced by the rotation of the steering wheel is transmitted to a rack bar through a rack-and-pinion mechanism and the steering assist power produced in the motor according to the produced steering torque is transmitted to the rack bar. That is, the steering torque produced by the steering wheel and the steering assist power produced in the motor are combined to move the rack bar in the axial direction.

Such an electric power steering apparatus suffers from a change of a mechanical characteristic as the traveled distance equipped with the electric power steering apparatus increases. When manufacturing a steering apparatus, a tuning value is tuned based on a new element. However, when the mechanical characteristic is changed, e.g., when an element of the electric power steering apparatus becomes worn out as the electric power steering apparatus is operated, a problem may occur in that the tuning value tuned at the time of manufacturing becomes incorrect.

SUMMARY OF THE INVENTION

The present invention has been made in consideration of the problems as described above, and an object of the present invention is to provide an electric power steering apparatus capable of correcting a difference in steering feeling by reflecting a change of a mechanical characteristic caused as the electric power steering apparatus is used, and a method of controlling the electric power steering apparatus.

In order to achieve the above-described object, there is provided an electric power steering apparatus. The electric power steering apparatus includes: a steering angle use frequency confirmation unit configured to confirm a steering angle use frequency value corresponding to a steering angle value received from a steering wheel sensor based on a use frequency graph stored in advance; a cumulative time calculation unit configured to calculate a cumulative operating time of the electric power steering apparatus; a compensating torque calculation unit configured to calculate a compensating torque based on the use frequency value and the cumulative operating time; and a drive control unit configured to calculate a target torque, to apply the compensating torque to the target torque, and to apply the target torque applied compensating torque to a motor.

According to another aspect of the present invention, there is provided a method of controlling an electric power steering apparatus. The method includes: sensing a steering angle and confirming a cumulative operating time; confirming a use frequency value based on a steering angle use frequency graph stored in advance for the sensed steering angle; calculating a compensating torque based on the use frequency value and the cumulative operating time; and applying the compensating torque to the target torque so as to drive a motor.

According to the present invention as described above, a difference in steering feeling according to a change of a mechanical characteristic of an electric power steering apparatus can be corrected so that the sense of difference in steering felt by a driver when using the steering apparatus can be minimized and the reliability in relation to the apparatus can be enhanced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
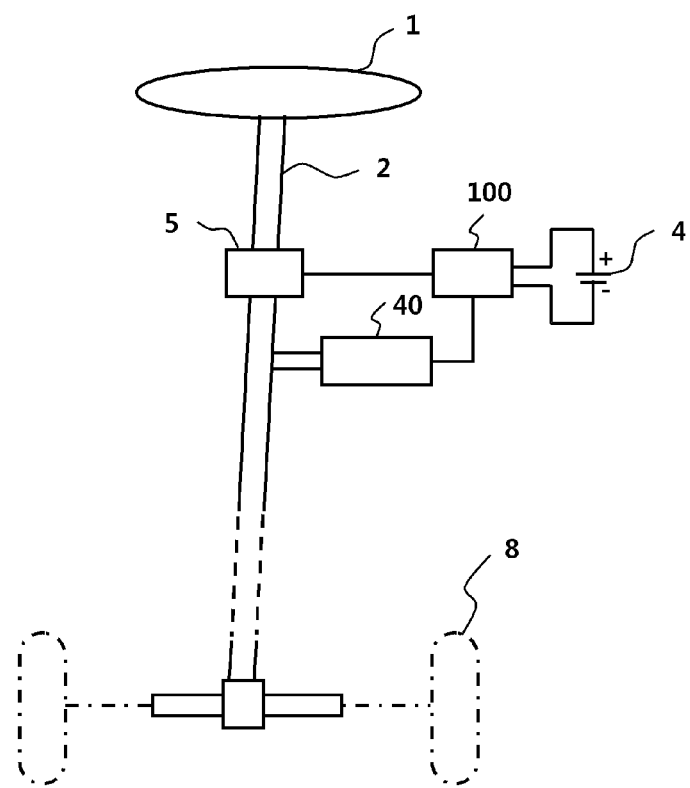
FIG. 1 is a configurational view schematically illustrating the overall configuration of an electric power steering apparatus according to an exemplary embodiment of the present invention.

Hereinafter, exemplary embodiments of the present invention will be described with reference to the exemplary drawings. In the following description, the same elements will be designated by the same reference numerals even if they are shown in different drawings. Further, in the following description of the present invention, a detailed description of known functions and configurations incorporated herein will be omitted when it may make the subject matter of the present invention rather unclear.

In addition, in the present specification, a "motor" is the same as a "steering motor" included an electric power steering apparatus and for the convenience of description, the terms "steering motor" and "motor" may be used together herein.

Prior to describing principal constitutional elements of an exemplary embodiment of the present invention, the overall configuration of an electric power steering apparatus according to an exemplary embodiment of the present invention will be described as follows.

FIG. 1 is a view illustrating the overall configuration of an electric power steering apparatus according to an exemplary embodiment of the present invention.

The electric power steering apparatus according to the exemplary embodiment of the present invention may include: a steering wheel 1; a steering shaft 2 connected to the steering wheel 1 to transmit a steering force by a driver; a torque sensor 5 configured to sense a steering torque produced in the steering wheel 1 as the driver manipulates the steering wheel 1; a steering wheel sensor (not illustrated) configured to sense a steering angle produced as the driver manipulates the steering wheel 1; a steering motor 40 configured to supply a steering assist force in such a manner that the vehicle wheels 8 may be steered to an extent desired by the driver; an electronic control unit 100 configured to control the steering motor 40 based on torque information received from the torque sensor 5 or steering information received from the steering wheel sensor; and a battery 4 that supplies a power to the electronic control unit 100.

The electronic control unit 100 includes a plurality of transistors therein and when the plurality of transistors perform a switching operation, the driving of the steering motor 40 is controlled. The plurality of transistors control the operation of the steering motor 7 by applying the battery voltage to each coil of the steering motor or cutting off the battery voltage based on a signal applied from the electronic control unit 100.

The electric power steering apparatus according to the exemplary body of the present invention is intended to minimize the change in steering feeling according to the operating time. Although, FIG. 1 exemplifies a C-EPS configuration, the present invention is not limited thereto, and may be applied to any steering apparatus as long as the steering apparatus includes a steering system connected to the steering wheel 1, the steering shaft 2, and the vehicle wheels 8.

Figure 2:
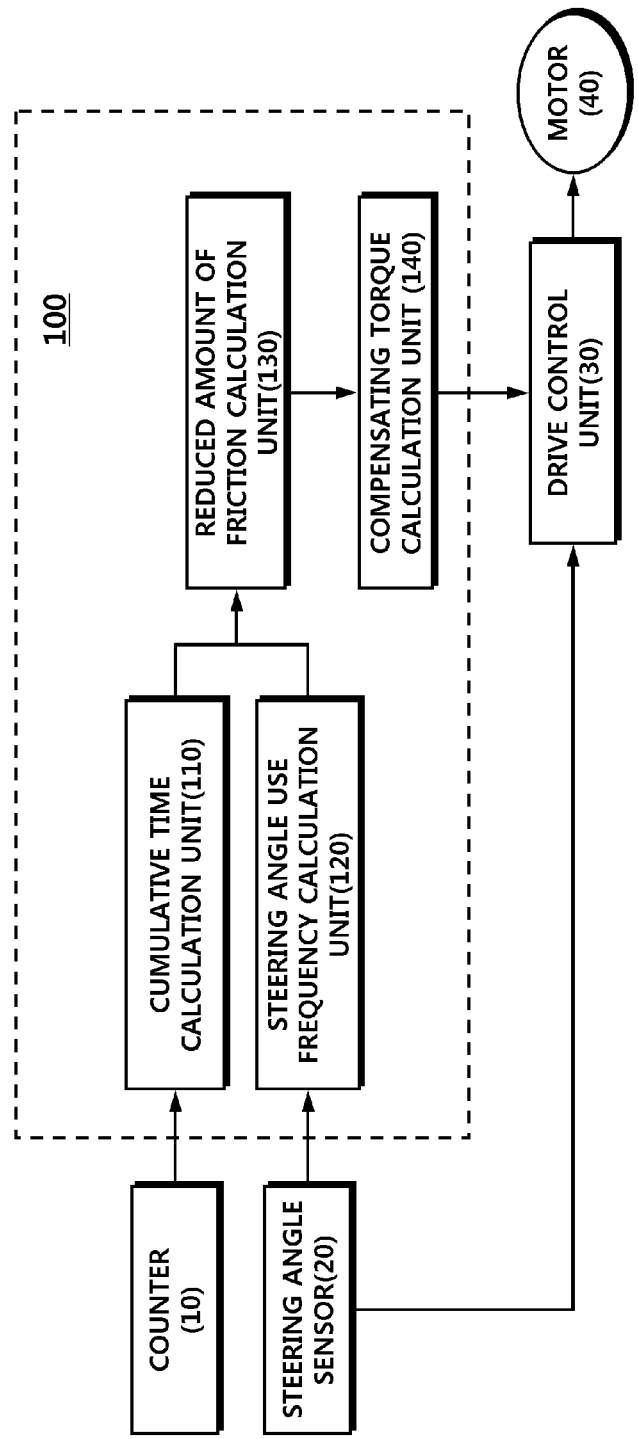
FIG. 2 is a block diagram illustrating a configuration of an electronic control unit of an electric power steering apparatus according to an exemplary embodiment of the present invention.

FIG. 2 is a block diagram illustrating a configuration of an electronic control unit of an electric power steering apparatus according to an exemplary embodiment of the present invention.

Referring to FIG. 2, the electronic control unit of the electric power steering apparatus according to the exemplary embodiment of the present invention includes: a cumulative time calculation unit 110 configured to calculate the cumulative operating time of the electric power steering apparatus; a steering angle use frequency confirmation unit 120 configured to confirm a use frequency value corresponding to a steering angle sensed by the steering wheel sensor 20; a compensating torque calculation unit 140 configured to calculate a compensating torque based on the use frequency value and the cumulative operating time; and a drive control unit 30 configured to produce and correct a target torque for controlling the driving of the motor 40 and produce a current corresponding to a corrected torque and apply to the motor 40.

The electric control unit may further include a reduced amount of friction calculation unit 130 configured to calculate the reduced amount of friction based on the use frequency value and the cumulative operating time and to transmit the reduced amount of friction to the compensating torque calculation unit 140.

The cumulative time calculation unit 110 cumulatively calculates the operating time of the electric power steering apparatus using a counter 10 provided in the electric power steering apparatus. The cumulative time calculation unit 110 calculates the operating time from the time when the electric power steering apparatus is supplied with a power and starts its operation to the time when the operation is ended based on the time information transmitted from the counter 10. And then, when the electric power steering apparatus starts its operation again, the cumulative time calculation unit 110 may calculate the cumulative operating time based on the time information transmitted from the counter 10 and using the previously calculated operating time as an initial value.

The steering angle use frequency confirmation unit 120 confirms how frequently steering is typically performed to the steering angle value received from the steering wheel sensor 20.

Figure 3:
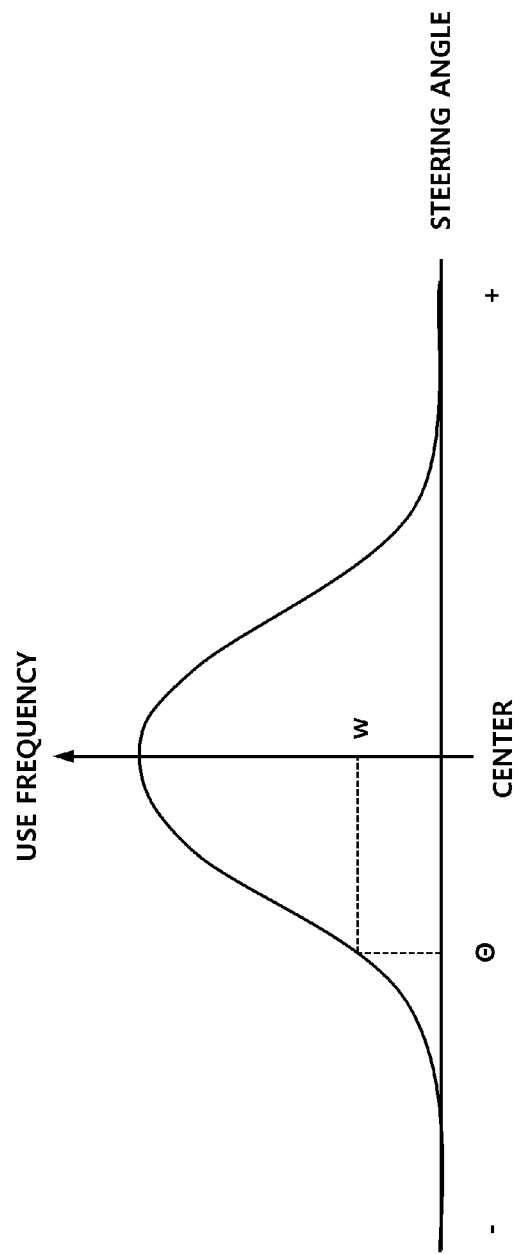
FIG. 3 is an exemplary view illustrating an example of a steering angle use frequency graph according to an exemplary embodiment of the present invention.

FIG. 3 is an exemplary view illustrating a steering angle use frequency graph according to an exemplary embodiment of the present invention.

The steering angle use frequency graph is a graph illustrating how frequently a steering angle value for the steering wheel 10 manipulated by the driver for each steering angle. As illustrated in FIG. 3, the steering angle value in a range of angle with reference to the center (0) of the steering wheel refers to most frequently manipulated by the driver. As approaching to the opposite ends of the graph, the manipulation frequency may be sharply reduced. It may be inferred from the fact that the steering wheel 1 is hardly turned to the opposite ends except in the case of, for example, U-turning or parking, in view of ordinary drivers' steering wheel 1 manipulation characteristics.

Accordingly, when the steering value received from the steering wheel sensor 20 is $-\theta$, the steering angle use frequency confirmation unit 120 may confirm w as the use frequency value corresponding to $-\theta$ through the steering angle use frequency graph and transmit the confirmed value w to the reduced amount of friction calculation unit 130.

The use frequency value for each steering angle sensed by the steering wheel sensor 20 may be derived through a statistical method and implemented as the steering use frequency graph to be stored in the electronic control unit of the electric power steering apparatus. However, the present invention is not limited thereto, and the use frequency value may be stored in various formats of data, for example, in a steering angle-use frequency table, and the steering angle use frequency confirmation unit 120 may confirm the use frequency of the steering value received from the steering wheel sensor 20 based on the steering angle use frequency graph or the steering angle-use frequency table stored in advance.

Upon receiving the cumulative operating time of the electric power steering apparatus from the cumulative time calculation unit 110 and receiving the use frequency value from the steering angle use frequency confirmation unit 120, the reduced amount of friction calculation unit 130 may calculate the reduced amount of friction for the steering system of the electric power steering apparatus. As the electric power steering apparatus is used, each constitutional element of the steering system tends to suffer from the reduction of a mechanical characteristic (e.g., friction) due to wear and tear. Thus, even if the driver manipulates the steering wheel to the same steering angle value, the steering assist force produced in the motor of the steering apparatus may be reduced as the operating time increases as compared to the initial stage of using the steering apparatus.

Accordingly, the reduced amount of friction calculation unit 130 determines how much the mechanical characteristic of the electric power steering apparatus is reduced based on the cumulative operating time of the steering apparatus and the use frequency (manipulation frequency) of the steering angle.

The reduced amount of friction calculation unit 130 may derive the level of the reduced amount based on reduced amount of friction determination data previously stored as to how the mechanical characteristic is reduced depending on each cumulative operating time and use frequency. For the same steering angle value or steering angle range, calculation may be performed in such manner that the shorter the cumulative operating time is, the more the reduced amount of friction is increased and as the cumulative operating time is increased, the reduced amount of friction is maintained at a constant value.

At this time, the reduced amount of friction determination data may be prepared such that the reduced amount of friction derived depending on each cumulative operating time and use frequency through tests is stored in a table format.

Although it has been described that the reduced amount of friction calculation unit 130 derives the level of reduced amount based on the previously stored reduced amount for friction determination data, the reduced amount of friction calculation unit 130 is not limited thereto. When a specific equation or algorithm is defined in which the cumulative operating time and the use frequency are variables, the reduced amount value may be calculated according to the defined equation or algorithm.

The compensating torque calculation unit 140 calculates a compensating torque for a target torque based on the reduced amount of friction received from the reduced amount of friction calculation unit 130. At this time, the compensating torque calculation unit 140 may include the function of the reduced amount of friction calculation unit 130. In such a case, the compensating torque calculation unit 140 may calculate the reduced amount of friction based on the data received from the cumulative time calculation unit 110 and the steering angle use frequency confirmation unit 120, and calculate the compensating torque according to the reduced amount of friction.

The drive control unit 30 may calculate the target torque based on the values input from sensors such as a torque sensor, a vehicle speed sensor, and a steering wheel sensor provided in the vehicle and applies the compensating torque transmitted from the compensating torque calculation unit 140 to the target torque to control the driving of the motor 40. At this time, considering the fact that, as the mechanical characteristic of the steering apparatus is reduced, even if a smaller amount of current is applied to the motor 40 as compared to the initial stage of use, a steering assist force similar to that applied at the initial stage of use may be provided, the drive control unit 30 preferably performs a control in such a manner that the compensating torque is applied to the target torque as a minus value.

For example, for the same steering angle, assuming that a control is made such that the target torque of 100 is produced at the initial stage, after the cumulative operating time is increased, the driver may feel a similar steering feeling even if a control is made such that a target torque of 95 is produced since the friction is reduced. In such a case, although the target torque is 100 which is the same as the previous value, the compensating torque of −5 is applied and thus, the final target torque to which the compensating torque is applied may become 95.

The electric power steering apparatus according to the exemplary embodiment of the present invention as described above is operated as follows.

Figure 4:
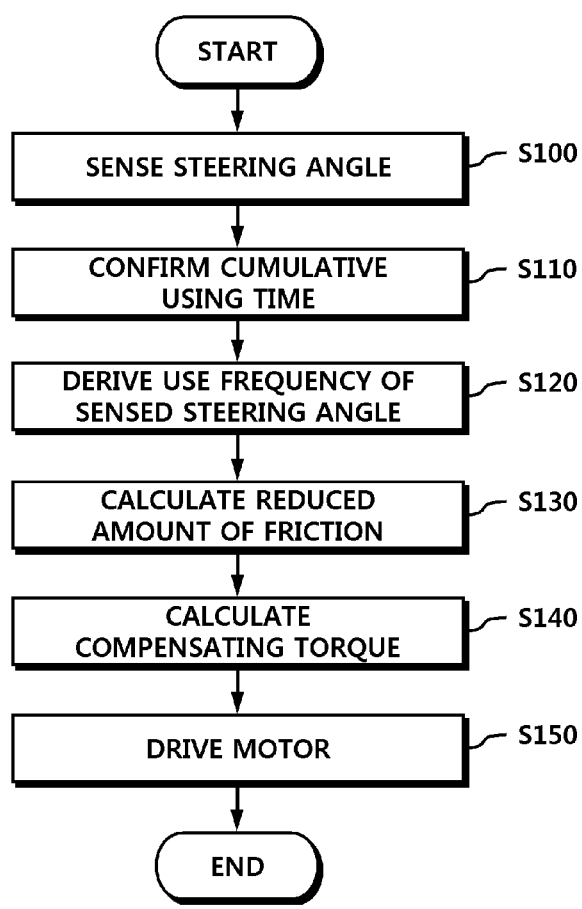
FIG. 4 is a flowchart illustrating a method of controlling an electric power steering apparatus according to an exemplary embodiment of the present invention.

FIG. 4 is a flowchart illustrating a method of the electric power steering apparatus according to the exemplary embodiment of the present invention.

Referring to FIG. 4, the method of controlling the electric power steering apparatus according to the exemplary embodiment of the present invention includes: sensing a steering angle and confirming a cumulative time (operating time) (S100, S110); confirming a use frequency value based on a steering angle use frequency graph stored in advance for the sensed steering angle (S120); calculating a reduced amount of friction based on the use frequency value and the cumulative use time, and calculating a compensating torque based on the reduced amount of friction (S130, S140); and driving the motor by applying the compensating torque to the target torque value calculated in advance to drive the motor (S150).

Although the exemplary embodiments of the present invention have been described for illustrative purposes, those skilled in the art will appreciate that various modifications and substitutions are possible, without departing from the scope and spirit of the invention as disclosed in the accompanying claims. Therefore, the exemplary embodiments disclosed in the present invention are intended to illustrate the scope of the technical idea of the present invention, and the scope of the present invention is not limited by the exemplary embodiments.

What is claimed is:

1. An electric power steering apparatus comprising:
   a steering angle use frequency confirmation unit configured to confirm a use frequency value corresponding to a steering angle value received from a steering wheel sensor based on a steering angle use frequency graph stored in advance;
   a cumulative time calculation unit configured to calculate a cumulative operating time of the electric power steering apparatus;
   a compensating torque calculation unit configured to calculate a compensating torque based on the use frequency value and the cumulative operating time; and
   a drive control unit configured to calculate a target torque, to apply the compensating torque to the target torque, and to apply the target torque applied compensating torque to a motor.

2. The electric power steering apparatus of claim 1, further comprising: a reduced amount of friction calculation unit configured to calculate a reduced amount of friction based on the use frequency value and the cumulative operating time and to transmit the calculated reduced amount of friction to the compensating torque calculation unit.

3. The electric power steering apparatus of claim 2, wherein the reduced amount of friction calculation unit calculates in such a manner that the shorter the cumulative use time, the more the reduced amount of friction is increased for the same steering angle value or steering angle range.

4. A method of controlling an electric power steering apparatus, comprising, wherein the apparatus having a processor configured to process steps of:
   sensing a steering angle and confirming a cumulative operating time;
   confirming a use frequency value based on a steering angle use frequency graph stored in advance for the sensed steering angle;
   calculating a compensating torque based on the use frequency value and the cumulative operating time; and
   applying the compensating torque to the target torque to drive a motor.

\* \* \* \* \*